United States Patent
Milne et al.

(10) Patent No.: US 10,904,600 B2
(45) Date of Patent: Jan. 26, 2021

(54) ACTIVATING AUDIO VIDEO DEVICE (AVD) FUNCTIONALITY AFTER POINT OF SALE

(71) Applicant: Sony Corporation, Tokyo (JP)

(72) Inventors: James R. Milne, Ramona, CA (US); Gregory Carlsson, Santee, CA (US); Steven Richman, San Diego, CA (US)

(73) Assignee: Sony Corporation, Tokyo (JP)

( * ) Notice: Subject to any disclaimer, the term of this patent is extended or adjusted under 35 U.S.C. 154(b) by 94 days.

(21) Appl. No.: 15/607,839

(22) Filed: May 30, 2017

(65) Prior Publication Data

US 2018/0352276 A1    Dec. 6, 2018

(51) Int. Cl.
*H04N 21/258* (2011.01)
*H04N 21/6547* (2011.01)
*G06Q 20/20* (2012.01)
*G06Q 30/00* (2012.01)
*H04N 21/414* (2011.01)
*G06Q 20/12* (2012.01)

(52) U.S. Cl.
CPC ..... *H04N 21/25816* (2013.01); *G06Q 20/123* (2013.01); *G06Q 20/20* (2013.01); *G06Q 30/018* (2013.01); *H04N 21/41415* (2013.01); *H04N 21/6547* (2013.01); *H04N 21/25841* (2013.01)

(58) Field of Classification Search
CPC ............ H04N 21/25816; H04N 5/225; H04N 21/25841; H04N 21/6547; G06Q 20/20; G06Q 30/018
See application file for complete search history.

(56) References Cited

U.S. PATENT DOCUMENTS

| | | | |
|---|---|---|---|
| 7,482,929 B2 | 1/2009 | Bowers et al. | |
| 8,396,748 B2 | 3/2013 | Shintani et al. | |
| 8,401,935 B2 | 3/2013 | Shintani et al. | |
| 8,487,739 B2 | 7/2013 | Lewis | |
| 8,543,513 B2 | 9/2013 | Shintani et al. | |
| 8,544,111 B2 | 9/2013 | Shintani et al. | |
| 8,589,305 B2 | 11/2013 | Shintani | |
| 8,665,093 B2 | 3/2014 | Peeters et al. | |
| 8,973,159 B2 | 3/2015 | Shintani et al. | |
| 2006/0132285 A1 | 6/2006 | Atkinson et al. | |
| 2008/0090527 A1 | 4/2008 | Atkinson et al. | |
| 2010/0263006 A1* | 10/2010 | Matsuyama | H04N 21/44227 725/109 |
| 2011/0153441 A1* | 6/2011 | Smith | G06Q 20/10 705/21 |
| 2012/0120321 A1* | 5/2012 | Shintani | H04N 9/641 348/726 |
| 2012/0120323 A1 | 5/2012 | Shintani et al. | |
| 2012/0124610 A1 | 5/2012 | Shintani et al. | |

(Continued)

*Primary Examiner* — Jamie J Atala
*Assistant Examiner* — Hesham K Abouzahra
(74) *Attorney, Agent, or Firm* — John L. Rogitz

(57) ABSTRACT

An audio video device (AVD) is activated post-sale using an unlock code issued during the purchase. The buyer connects to his home network and enters the unlock code issued in the store at the point of sale. Then a server associated with the seller can complete the transaction and unlock the AVD for full functionality. In the event the AVD is reported stolen before activation, it can be blocked from use. When in the reduced functionality mode" the AVD can remain in demonstration mode or other reduced functionality state (e.g., only works with HDMI1).

11 Claims, 2 Drawing Sheets

(56) References Cited

U.S. PATENT DOCUMENTS

| | | |
|---|---|---|
| 2012/0124614 A1 | 5/2012 | Shintani et al. |
| 2013/0041829 A1 | 2/2013 | Shintani et al. |
| 2013/0232524 A1* | 9/2013 | Candelore .......... H04N 21/2585 |
| | | 725/30 |
| 2014/0013348 A1 | 1/2014 | Shintani |
| 2014/0108169 A1 | 4/2014 | Shintani et al. |

\* cited by examiner

ACTIVATING AUDIO VIDEO DEVICE (AVD) FUNCTIONALITY AFTER POINT OF SALE

FIELD

The present application relates to technically inventive, non-routine solutions that are necessarily rooted in computer technology and that produce concrete technical improvements.

BACKGROUND

Audio video devices (AVD) such as so-called "smart" TVs that are Internet-enabled are, like other valuable items, susceptible to theft. Such theft may occur, for example, during storage, transportation, exhibition and even after purchase by a thief in the parking lot of a retail establishment from which the device is sold. As understood herein, rendering such devices less valuable in the event of theft reduces the incentive to steal them.

SUMMARY

Present principles recognize that AVDs may be activate post-sale with a code that is issued to a buyer during the purchase. To activate the AVD, the buyer must connect to his home network and enter the code issued in store. A server, typically affiliated with the AVD manufacturer, completes the transaction upon receipt of the code, unlocking the AVD for full functionality. Thus, in the event the AVD is, for instance, reported stolen before activation, it is blocked from all or partial use.

When in such a "locked mode," the AVD may remain in a demonstration mode or a reduced functionality state (e.g., will work only with an older or otherwise less capable protocol such as high definition content protection-1 (HDMI1). If the AVD subsequently is resold, the AVD can be put back into the locked mode until the new owner activates it. Also, if an AVD is reported to have been stolen after activation, it can be disabled.

Accordingly, a system includes at least one audio video device (AVD) that in turn includes at least one video display, at least one network interface, and circuitry configured to maintain the AVD in a reduced operational state. The circuitry is configured to enable a full operational state of the AVD only upon receipt of an enable command from a server via the network interface.

The system may also include the server. The server may be configured to send the enable command to the AVD responsive to receiving an unlock code from a computer. Accordingly, the computer can be configured to send the unlock code to the server. The system may include the computer, which may be the AVD itself or may be different from the AVD.

In some examples, the circuitry can be configured to, subsequent to enabling the full operational state of the AVD upon receipt of the enable command from the server, receive a disable command from the server. The circuitry may be configured to, responsive to the disable signal, maintain the AVD in the reduced operational state.

In another aspect, a method comprises vending at least one audio video device (AVD) at a point of sale, and maintaining the AVD in a reduced operational state. The method includes enabling a full operational state of the AVD only upon receipt of an enable command from a server via a network interface.

In another aspect, a server includes at least one processor and at least one computer storage with instructions executable by the at least one processor to receive an unlock code from a network address. The instructions are executable to determine whether the network address matches a stored address, determine whether the unlock code is valid, and responsive to determining that the unlock code is valid and the network address matches a stored address, send an enable command to an audio video device (AVD) to reconfigure the AVD from a reduced functionality mode to a full functionality mode. On the other hand, the instructions are executable to, responsive to determining that either the unlock code is not valid or the network address does not match a stored address, not send the enable command to the AVD.

The details of the present disclosure, both as to its structure and operation, can be best understood in reference to the accompanying drawings, in which like reference numerals refer to like parts, and in which:

DETAILED DESCRIPTION

Figure 1:
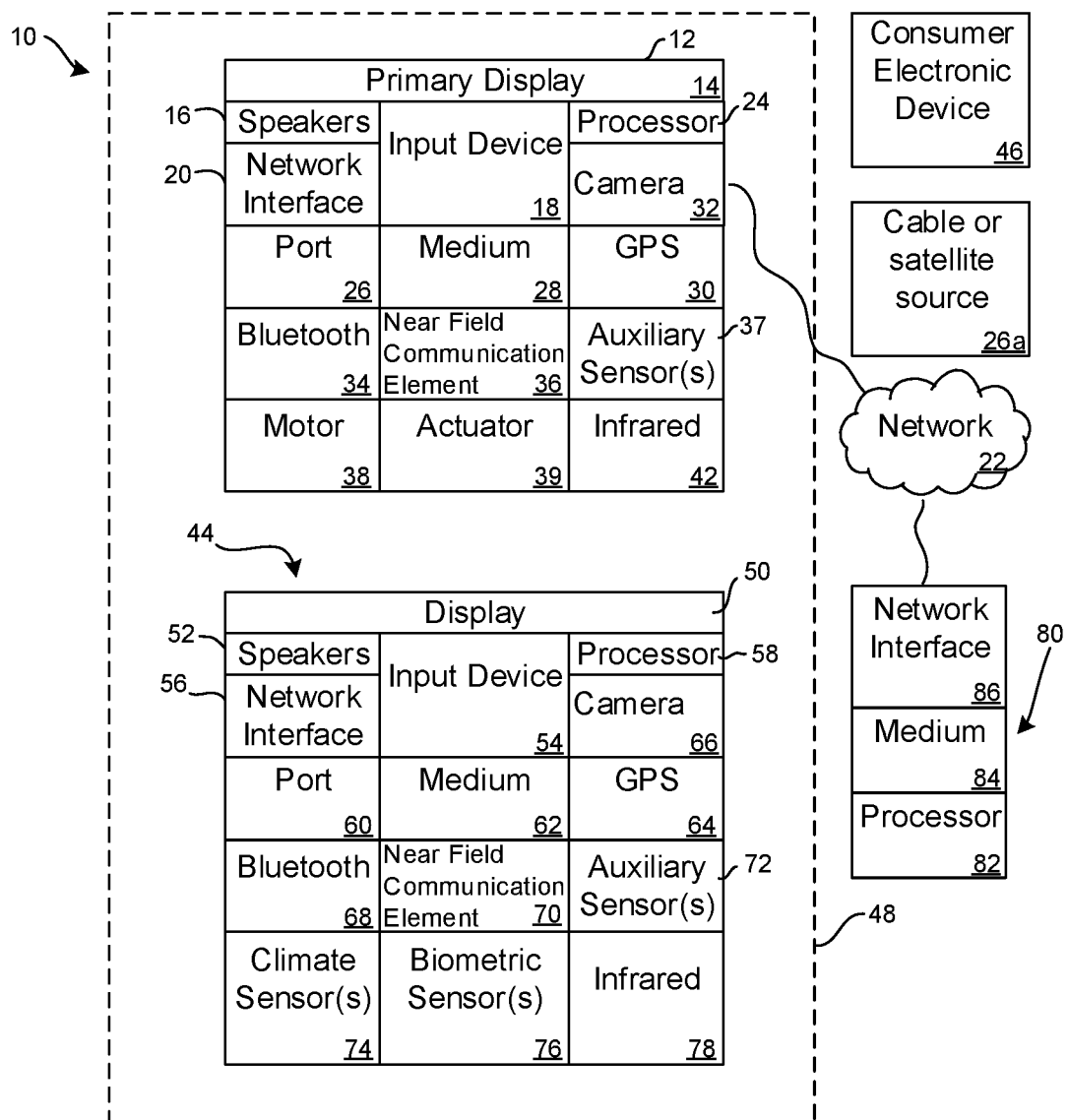
FIG. 1 is a block diagram of an example system including an example in consistent with present principles.

This disclosure relates generally to computer ecosystems including aspects of consumer electronics (CE) device based user information in computer ecosystems. A system herein may include server and client components, connected over a network such that data may be exchanged between the client and server components. The client components may include one or more computing devices including portable televisions (e.g. smart TVs, Internet-enabled TVs), portable computers such as laptops and tablet computers, and other mobile devices including smart phones and additional examples discussed below. These client devices may operate with a variety of operating environments. For example, some of the client computers may employ, as examples, operating systems from Microsoft, or a Unix operating system, or operating systems produced by Apple Computer or Google. These operating environments may be used to execute one or more browsing programs, such as a browser made by Microsoft or Google or Mozilla or other browser program that can access web applications hosted by the Internet servers discussed below.

Servers may include one or more processors executing instructions that configure the servers to receive and transmit data over a network such as the Internet. Or, a client and server can be connected over a local intranet or a virtual private network. A server or controller may be instantiated by a game console such as a Sony Playstation®, a personal computer, etc.

Information may be exchanged over a network between the clients and servers. To this end and for security, servers and/or clients can include firewalls, load balancers, temporary storages, and proxies, and other network infrastructure for reliability and security. One or more servers may form an apparatus that implement methods of providing a secure community such as an online social website to network members.

As used herein, instructions refer to computer-implemented steps for processing information in the system. Instructions can be implemented in software, firmware or hardware and include any type of programmed step undertaken by components of the system.

A processor may be any conventional general purpose single- or multi-chip processor that can execute logic by means of various lines such as address lines, data lines, and control lines and registers and shift registers.

Software modules described by way of the flow charts and user interfaces herein can include various sub-routines, procedures, etc. Without limiting the disclosure, logic stated to be executed by a particular module can be redistributed to other software modules and/or combined together in a single module and/or made available in a shareable library.

Present principles described herein can be implemented as hardware, software, firmware, or combinations thereof; hence, illustrative components, blocks, modules, circuits, and steps are set forth in terms of their functionality.

Further to what has been alluded to above, logical blocks, modules, and circuits described below can be implemented or performed with a general purpose processor, a digital signal processor (DSP), a field programmable gate array (FPGA) or other programmable logic device such as an application specific integrated circuit (ASIC), discrete gate or transistor logic, discrete hardware components, or any combination thereof designed to perform the functions described herein. A processor can be implemented by a controller or state machine or a combination of computing devices.

The functions and methods described below, when implemented in software, can be written in an appropriate language such as but not limited to C# or C++, and can be stored on or transmitted through a computer-readable storage medium such as a random access memory (RAM), read-only memory (ROM), electrically erasable programmable read-only memory (EEPROM), compact disk read-only memory (CD-ROM) or other optical disk storage such as digital versatile disc (DVD), magnetic disk storage or other magnetic storage devices including removable thumb drives, etc. A connection may establish a computer-readable medium. Such connections can include, as examples, hardwired cables including fiber optics and coaxial wires and digital subscriber line (DSL) and twisted pair wires.

Components included in one embodiment can be used in other embodiments in any appropriate combination. For example, any of the various components described herein and/or depicted in the Figures may be combined, interchanged or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together, etc.

Now specifically referring to FIG. 1, an example ecosystem 10 is shown, which may include one or more of the example devices mentioned above and described further below in accordance with present principles. The first of the example devices included in the system 10 is an example primary display device, and in the embodiment shown is an audio video display device (AVDD) 12 such as but not limited to an Internet-enabled TV. Thus, the AVDD 12 alternatively may be an appliance or household item, e.g. computerized Internet enabled refrigerator, washer, or dryer. The AVDD 12 alternatively may also be a computerized Internet enabled ("smart") telephone, a tablet computer, a notebook computer, a wearable computerized device such as e.g. computerized Internet-enabled watch, a computerized Internet-enabled bracelet, other computerized Internet-enabled devices, a computerized Internet-enabled music player, computerized Internet-enabled head phones, a computerized Internet-enabled implantable device such as an implantable skin device, etc. Regardless, it is to be understood that the AVDD 12 is configured to undertake present principles (e.g. communicate with other CE devices to undertake present principles, execute the logic described herein, and perform any other functions and/or operations described herein).

Accordingly, to undertake such principles the AVDD 12 can be established by some or all of the components shown in FIG. 1. For example, the AVDD 12 can include one or more displays 14 that may be implemented by a high definition or ultra-high definition "4K" or "8K" (or higher resolution) flat screen and that may be touch-enabled for receiving consumer input signals via touches on the display. The AVDD 12 may include one or more speakers 16 for outputting audio in accordance with present principles, and at least one additional input device 18 such as e.g. an audio receiver/microphone for e.g. entering audible commands to the AVDD 12 to control the AVDD 12. The example AVDD 12 may also include one or more network interfaces 20 for communication over at least one network 22 such as the Internet, an WAN, an LAN, etc. under control of one or more processors 24. Thus, the interface 20 may be, without limitation, a Wi-Fi transceiver, which is an example of a wireless computer network interface. It is to be understood that the processor 24 controls the AVDD 12 to undertake present principles, including the other elements of the AVDD 12 described herein such as e.g. controlling the display 14 to present images thereon and receiving input therefrom. Furthermore, note the network interface 20 may be, e.g., a wired or wireless modem or router, or other appropriate interface such as, e.g., a wireless telephony transceiver, or Wi-Fi transceiver as mentioned above, etc.

In addition to the foregoing, the AVDD 12 may also include one or more input ports 26 such as, e.g., a USB port to physically connect (e.g. using a wired connection) to another CE device and/or a headphone port to connect headphones to the AVDD 12 for presentation of audio from the AVDD 12 to a consumer through the headphones. The AVDD 12 may further include one or more computer memories 28 that are not transitory signals, such as disk-based or solid state storage (including but not limited to flash memory). Also in some embodiments, the AVDD 12 can include a position or location receiver such as but not limited to a cellphone receiver, GPS receiver and/or altimeter 30 that is configured to e.g. receive geographic position information from at least one satellite or cellphone tower and provide the information to the processor 24 and/or determine an altitude at which the AVDD 12 is disposed in conjunction with the processor 24. However, it is to be understood that that another suitable position receiver other than a cellphone receiver, GPS receiver and/or altimeter may be used in accordance with present principles to e.g. determine the location of the AVDD 12 in e.g. all three dimensions.

Continuing the description of the AVDD 12, in some embodiments the AVDD 12 may include one or more cameras 32 that may be, e.g., a thermal imaging camera, a digital camera such as a webcam, and/or a camera integrated into the AVDD 12 and controllable by the processor 24 to gather pictures/images and/or video in accordance with present principles. Also included on the AVDD 12 may be a Bluetooth transceiver 34 and other Near Field Communication (NFC) element 36 for communication with other devices using Bluetooth and/or NFC technology, respectively. An example NFC element can be a radio frequency identification (RFID) element.

Further still, the AVDD 12 may include one or more auxiliary sensors 37 (e.g., a motion sensor such as an accelerometer, gyroscope, cyclometer, or a magnetic sensor, an infrared (IR) sensor, an optical sensor, a speed and/or cadence sensor, a gesture sensor (e.g. for sensing gesture command, etc.) providing input to the processor 24. The AVDD 12 may include still other sensors such as e.g. one or more climate sensors 38 (e.g. barometers, humidity sensors, wind sensors, light sensors, temperature sensors, etc.) and/or one or more biometric sensors 40 providing input to the processor 24. In addition to the foregoing, it is noted that the AVDD 12 may also include an infrared (IR) transmitter and/or IR receiver and/or IR transceiver 42 such as an IR data association (IRDA) device. A battery (not shown) may be provided for powering the AVDD 12.

Still referring to FIG. 1, in addition to the AVDD 12, the system 10 may include one or more other CE device types. In one example, a first CE device 44 may be used to control the display via commands sent through the below-described server while a second CE device 46 may include similar components as the first CE device 44 and hence will not be discussed in detail. In the example shown, only two CE devices 44, 46 are shown, it being understood that fewer or greater devices may be used.

In the example shown, to illustrate present principles all three devices 12, 44, 46 are assumed to be members of an entertainment network in, e.g., in a home, or at least to be present in proximity to each other in a location such as a house. However, for illustrating present principles the first CE device 44 is assumed to be in the same room as the AVDD 12, bounded by walls illustrated by dashed lines 48.

The example non-limiting first CE device 44 may be established by any one of the above-mentioned devices, for example, a portable wireless laptop computer or notebook computer, and accordingly may have one or more of the components described below. The second CE device 46 without limitation may be established by a wireless telephone. The second CE device 46 may implement a portable hand-held remote control (RC).

The first CE device 44 may include one or more displays 50 that may be touch-enabled for receiving consumer input signals via touches on the display. The first CE device 44 may include one or more speakers 52 for outputting audio in accordance with present principles, and at least one additional input device 54 such as e.g. an audio receiver/microphone for e.g. entering audible commands to the first CE device 44 to control the device 44. The example first CE device 44 may also include one or more network interfaces 56 for communication over the network 22 under control of one or more CE device processors 58. Thus, the interface 56 may be, without limitation, a Wi-Fi transceiver, which is an example of a wireless computer network interface. It is to be understood that the processor 58 may control the first CE device 44 to undertake present principles, including the other elements of the first CE device 44 described herein such as e.g. controlling the display 50 to present images thereon and receiving input therefrom. Furthermore, note the network interface 56 may be, e.g., a wired or wireless modem or router, or other appropriate interface such as, e.g., a wireless telephony transceiver, or Wi-Fi transceiver as mentioned above, etc.

In addition to the foregoing, the first CE device 44 may also include one or more input ports 60 such as, e.g., a USB port to physically connect (e.g. using a wired connection) to another CE device and/or a headphone port to connect headphones to the first CE device 44 for presentation of audio from the first CE device 44 to a consumer through the headphones. The first CE device 44 may further include one or more computer memories 62 such as disk-based or solid state storage. Also in some embodiments, the first CE device 44 can include a position or location receiver such as but not limited to a cellphone and/or GPS receiver and/or altimeter 64 that is configured to e.g. receive geographic position information from at least one satellite and/or cell tower, using triangulation, and provide the information to the CE device processor 58 and/or determine an altitude at which the first CE device 44 is disposed in conjunction with the CE device processor 58. However, it is to be understood that that another suitable position receiver other than a cellphone and/or GPS receiver and/or altimeter may be used in accordance with present principles to e.g. determine the location of the first CE device 44 in e.g. all three dimensions.

Continuing the description of the first CE device 44, in some embodiments the first CE device 44 may include one or more cameras 66 that may be, e.g., a thermal imaging camera, a digital camera such as a webcam, and/or a camera integrated into the first CE device 44 and controllable by the CE device processor 58 to gather pictures/images and/or video in accordance with present principles. Also included on the first CE device 44 may be a Bluetooth transceiver 68 and other Near Field Communication (NFC) element 70 for communication with other devices using Bluetooth and/or NFC technology, respectively. An example NFC element can be a radio frequency identification (RFID) element.

Further still, the first CE device 44 may include one or more auxiliary sensors 72 (e.g., a motion sensor such as an accelerometer, gyroscope, cyclometer, or a magnetic sensor, an infrared (IR) sensor, an optical sensor, a speed and/or cadence sensor, a gesture sensor (e.g. for sensing gesture command, etc.) providing input to the CE device processor 58. The first CE device 44 may include still other sensors such as e.g. one or more climate sensors 74 (e.g. barometers, humidity sensors, wind sensors, light sensors, temperature sensors, etc.) and/or one or more biometric sensors 76 providing input to the CE device processor 58. In addition to the foregoing, it is noted that in some embodiments the first CE device 44 may also include an infrared (IR) transmitter and/or IR receiver and/or IR transceiver 78 such as an IR data association (IRDA) device. A battery (not shown) may be provided for powering the first CE device 44.

The second CE device 46 may include some or all of the components shown for the CE device 44.

Now in reference to the afore-mentioned at least one server 80, it includes at least one server processor 82, at least one computer memory 84 such as disk-based or solid state storage, and at least one network interface 86 that, under control of the server processor 82, allows for communication with the other devices of FIG. 1 over the network 22, and indeed may facilitate communication between servers and client devices in accordance with present principles. Note that the network interface 86 may be, e.g., a wired or wireless modem or router, Wi-Fi transceiver, or other appropriate interface such as, e.g., a wireless telephony transceiver.

Accordingly, in some embodiments the server 80 may be an Internet server, and may include and perform "cloud" functions such that the devices of the system 10 may access a "cloud" environment via the server 80 in example embodiments. Or, the server 80 may be implemented by a game console or other computer in the same room as the other devices shown in FIG. 1 or nearby.

Figure 2:
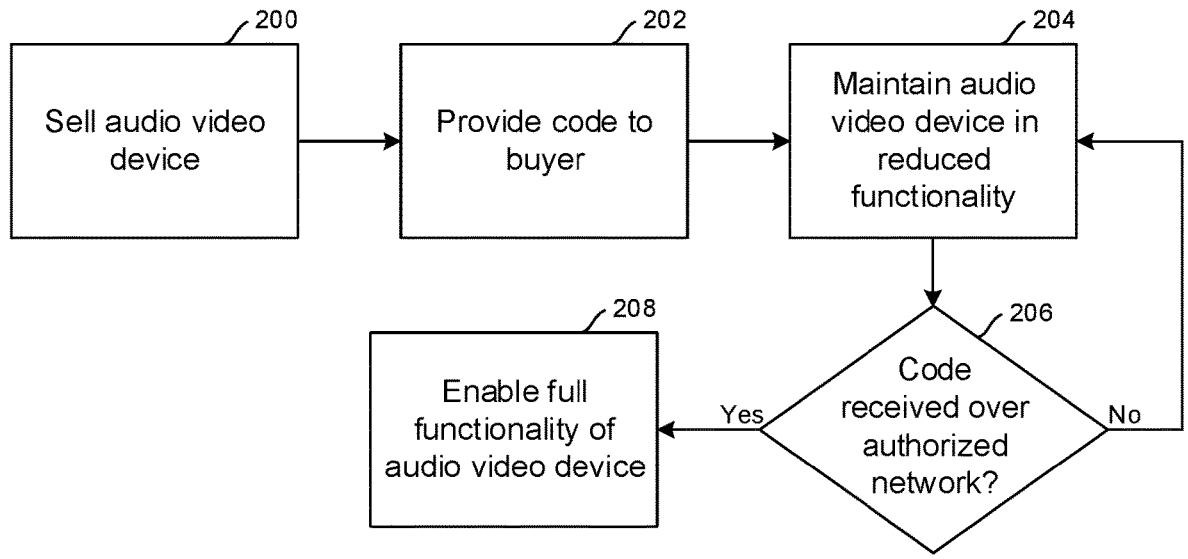
FIGS. 2 and 3 are flow charts of example logic consistent with present principles.

FIG. 2 shows logic consistent with present principles. An audio video device (AVD) such as any of the devices described above can be vended at block 200. The AVD when sold is in a reduced functionality state, such as a demonstration mode or a mode that limits the AVD to work only with an older audio video protocol such as high definition multimedia interface-1 (HDMI1).

Moving to block 202, the buyer may be provided an unlock code. The unlock code may be an alpha-numeric string, including symbols if desired, printed on a sales receipt, wirelessly transmitted to the buyer's mobile computing device via, e.g., Bluetooth from the point of sale (POS) terminal, mailed to the buyer, emailed to the buyer, texted to the buyer, etc.

The AVD is maintained in the reduced functionality state at block 204. Decision diamond 206 represents a state logic in which the AVD is maintained in the reduced functionality state at block 204 until such time as the buyer enters the correct unlock code, in which case the logic moves to block 208 to establish full functionality of the AVD by, e.g., sending an activation code (an example of an enable command) from an Internet (cloud) server of the seller to the network address of the AVD or home system connected to the AVD.

The buyer may enter the unlock code from his mobile computer or home computer or home entertainment system using an appropriate input device, including by speaking the code into a microphone. In an example, the buyer must enter the unlock code from his home computer or home entertainment system, the identification of which the buyer can provide to the seller during the sales process. The unlock code can be entered by connecting the buyer's home system to a cloud server associated with the seller, the network address of which the seller can provide to the buyer during sale, and the cloud server of the seller can then verify that both the unlock code received from the buyer and the network address of the buyer's home computer/system are correct. If either is not correct, the activation code is not sent to the AVD. In other embodiments, only the unlock code need be successfully sent from a computer of the buyer to the cloud server of the seller for the activation code to be sent to the AVD to render it fully operational.

Figure 3:
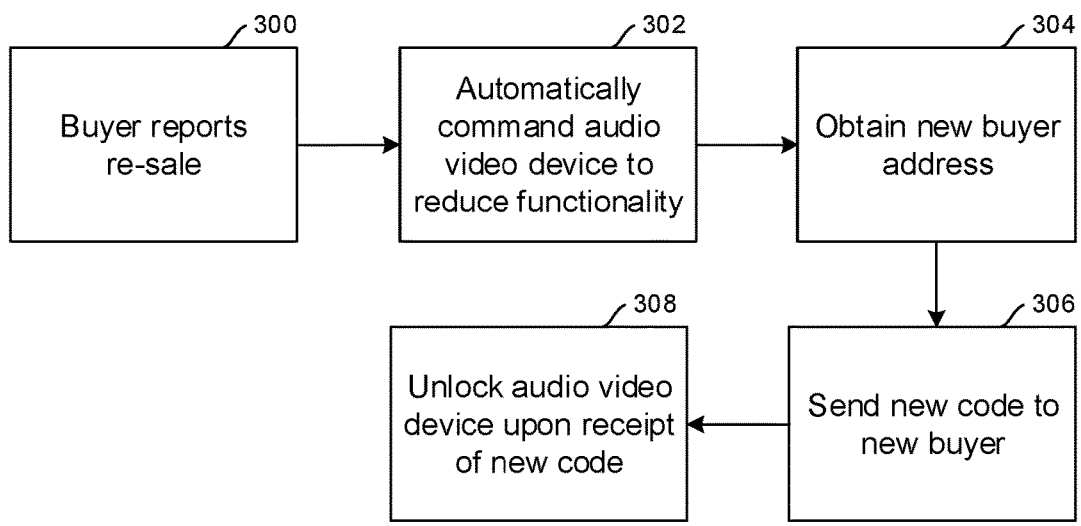

If the AVD is sold to someone else, it can be put back into the reduced functionality mode, until the new owner activates it. Also, if the AVD is stolen after activation, it can be disabled by the owner. FIG. 3 illustrates.

At block 300, the buyer, using any of the communication paths previously discussed, reports re-sale of the AVD (equivalently, reports that the AVD is stolen). In response, at block 302 the seller's cloud server can automatically send a deactivation code, typically wirelessly via, e.g., Wi-Fi or wireless telephony systems, to the network address of the AVD. The deactivation code may completely deactivate the AVD, or it may simply command it to re-enter the reduced functionality state. At block 304, in the case of a new, legitimate buyer, the new buyer can provide the seller with his network address, with the seller sending a new unlock code at block 306 from the seller's cloud server to the new buyer. The new buyer can input the new unlock code at block 308 for converting the AVD to the full functionality state according to principles set forth in FIG. 2 and discussed above.

While particular techniques are herein shown and described in detail, it is to be understood that the subject matter which is encompassed by the present application is limited only by the claims.

What is claimed is:

1. A system comprising:
   at least one server;
   at least one end user computer;
   at least one audio video device (AVD) different from the end user computer and the server and comprising:
   at least one video display;
   at least one network interface; and
   circuitry configured to:
   maintain the AVD in a reduced operational state;
   enable a full operational state of the AVD upon receipt of an enable command from the server,
   the server comprising circuitry configured to:
   generate the enable command to enable the full operational state of the AVD responsive to (1) receipt of a correct unlock code from the end user computer and (2) identifying that a network address of the end user computer from whence the unlock code is received matches a stored address; and
   not generate the enable command to enable the full operational state of the AVD responsive to failure of either (1) receipt of a correct unlock code from the end user computer or (2) identifying that a network address of the end user computer from whence the unlock code is received matches a stored address wherein the circuitry of the server is configured to send the enable command to a network address of the AVD, the network address of the AVD being different from the network address of the end user computer.

2. The system of claim 1, wherein the circuitry is configured to:
   subsequent to enabling the full operational state of the AVD upon receipt of the enable command from the server, receive a disable command from the server; and
   responsive to the disable signal, maintain the AVD in the reduced operational state.

3. A method, comprising:
   vending at least one audio video device (AVD);
   maintaining the AVD in a reduced operational state;
   enabling a full operational state of the AVD upon receipt of an enable command, wherein the enable command is generated by at least one server different from both the AVD and an end user computer, the server generating the enable command responsive to a match of a network address of the end user computer, which is different from the AVD, with a stored network address, and receipt by the server of a correct unlock code from the end user computer, such that the enable command is sent to enable the full operational state of the AVD responsive to a correct unlock code being received from a correct network address of the end user computer which is different from the AVD; and
   sending the enable command to a network address of the AVD, the network address of the AVD being different from the network address of the end user computer.

4. The method of claim 3, comprising:
   sending the authorization code to the server.

5. The method of claim 3, comprising:
   subsequent to enabling the full operational state of the AVD upon receipt of the enable command from the server, receiving a disable command from the server; and
   responsive to the disable signal, maintaining the AVD in the reduced operational state.

6. The method of claim 3, wherein the reduced operational state prevents use of the AVD using a first protocol and enables use of the AVD using only a second protocol older than the first protocol.

7. A server, comprising:
   at least one processor configured with instructions executable to:

receive an unlock code, originated at an end user computer, from a network address of the end user computer;

determine whether the network address matches a stored address of the end user computer;

determine whether the unlock code is valid;

responsive to determining that the unlock code is valid and the network address matches a stored address, send an enable command to a network address of an audio video device (AVD) different from the network address of the end user computer to reconfigure the AVD from a reduced functionality mode to a full functionality mode; and responsive to determining that either the unlock code is not valid or the network address does not match a stored address, not send the enable command to the AVD wherein the instructions are executable to send the enable command to a network address of the AVD, the network address of the AVD being different from the network address of the end user computer.

8. The server of claim 7, wherein the instructions are executable to:

subsequent to enabling the full functionality mode of the AVD, receive a disable request from the AVD; and responsive to the disable request, send a command to the AVD to enter the reduced functionality mode.

9. The server of claim 8, wherein the instructions are executable to:

receive a network address associated with a new buyer of the AVD; and send a new enable command to the network address associated with the new buyer to reconfigure the AVD from the reduced functionality mode to the full functionality mode.

10. The server of claim 7, wherein the reduced functionality mode is a demonstration mode.

11. The server of claim 7, wherein the reduced functionality mode prevents use of the AVD using a first protocol and enables use of the AVD using only a second protocol older than the first protocol.

* * * * *